United States Patent
Bitto et al.

(10) Patent No.: US 7,051,598 B2
(45) Date of Patent: May 30, 2006

(54) MAGNETIC CIRCUIT ARRANGEMENT FOR A SENSOR

(75) Inventors: Ennio Bitto, Aesch (CH); Gerhard Eckert, Rheinfelden (DE)

(73) Assignee: Endress + Hauser Flowtec AG, Reinach (CH)

(*) Notice: Subject to any disclaimer, the term of this patent is extended or adjusted under 35 U.S.C. 154(b) by 41 days.

(21) Appl. No.: 10/805,391

(22) Filed: Mar. 22, 2004

(65) Prior Publication Data
US 2004/0221661 A1 Nov. 11, 2004

Related U.S. Application Data

(60) Provisional application No. 60/463,055, filed on Apr. 16, 2003.

(30) Foreign Application Priority Data

Mar. 21, 2003 (DE) .................................. 103 12 796

(51) Int. Cl.
*G01F 1/84* (2006.01)
(52) U.S. Cl. .................................. 73/861.355
(58) Field of Classification Search ............... None
See application file for complete search history.

(56) References Cited

U.S. PATENT DOCUMENTS

| | | | |
|---|---|---|---|
| 2,982,888 A | 5/1961 | Whearley | 335/299 |
| 4,756,198 A | 7/1988 | Levien | 73/861.355 |
| 5,796,011 A | 8/1998 | Keita et al. | 73/861.357 |
| 6,666,098 B1 * | 12/2003 | Drahm et al. | 73/861.355 |
| 6,807,866 B1 * | 10/2004 | Drahm et al. | 73/861.355 |

FOREIGN PATENT DOCUMENTS

| | | |
|---|---|---|
| DE | 694 13 853 T2 | 4/1999 |
| EP | 0 553 939 B1 | 8/1993 |
| EP | 0 685 712 A1 | 6/1995 |
| EP | 0 803 713 A1 | 10/1997 |
| WO | WO 02/088641 A1 | 11/2002 |

* cited by examiner

*Primary Examiner*—Harshad Patel
(74) *Attorney, Agent, or Firm*—Bacon & Thomas

(57) ABSTRACT

The invention relates to a mount for electrical leads to a vibration-type sensor and/or for coils on a vibration-type sensor. The mount includes at least one resilient first arm attached to a first sensing tube of a sensor and at least one resilient arm attached to a second sensing tube of the sensor, wherein the two sensing tubes, which are caused to vibrate during operation of the sensor, form a double-tube arrangement having a longitudinal gravity line, which lies in an imaginary central plane extending between the two, preferably parallel, sensing tubes, and the two arms of the mount are essentially rigidly connected to one another at a connecting location remote from the two sensing tubes, that the mount exhibits a first eigenmode of predeterminable mechanical resonance frequency, $f_1$, at which the first arm attached to the first sensing tube and the second arm attached to the second sensing tube oscillate pendularly essentially perpendicular to the central plane of the double-tube arrangement, and that the mount exhibits a second eigenmode of predeterminable mechanical resonance frequency, $f_2$, at which the first arm attached to the first sensing tube and the second arm attached to the second sensing tube oscillate pendularly essentially parallel to the central plane of the double-tube arrangement, and wherein the resonance frequency, $f_1$, of the first eigenmode is different from the resonance frequency, $f_2$, of the second eigenmode.

16 Claims, 5 Drawing Sheets

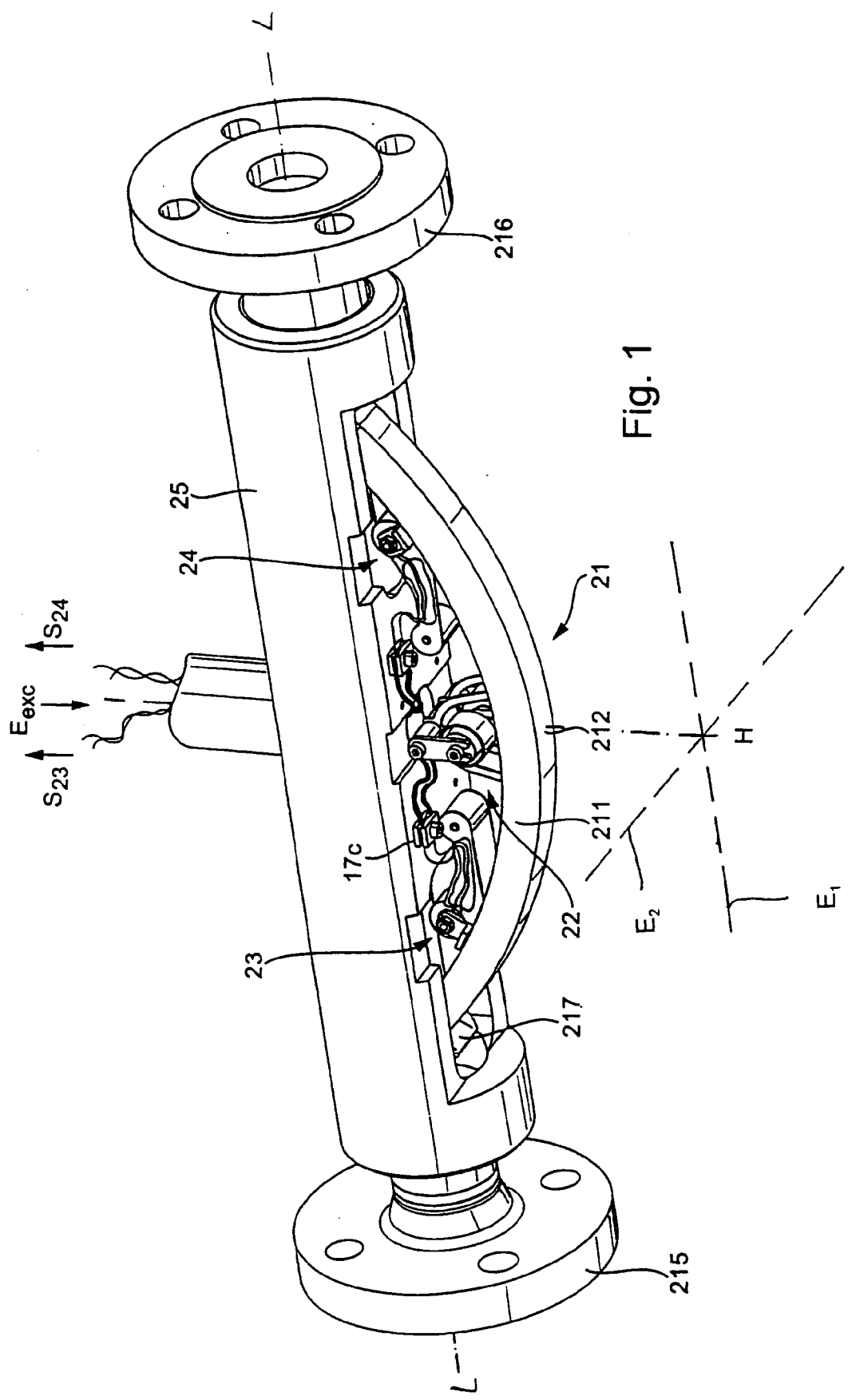

MAGNETIC CIRCUIT ARRANGEMENT FOR A SENSOR

This application claims the benefit of provisional application No. 60/463,055 filed on Apr. 16. 2003.

FIELD OF THE INVENTION

The invention relates to a magnetic circuit arrangement suited for use in a vibration-type sensor, especially a Coriolis mass flow sensor.

BACKGROUND OF THE INVENTION

For determining mass flow rate of a fluid flowing in a pipe, especially that of a liquid, Coriolis mass flow meters are often used. As is known, these meters cause Coriolis forces in the fluid by means of a corresponding vibration-type sensor, driven by a control—and evaluation-electronics connected thereto, and use these forces to produce a measurement signal representing the mass flow rate.

Coriolis mass flow meters are long known and are used industrially. Examples of such meters are presented in EP-A 1 154 243, U.S. Pat. Nos. 4,876,898, 4,801,897, 5,048,350, 5,301,557, 5,394,758, 5,549,009, 5,796,011, and WO-A 02/099363, which describe Coriolis mass flow meters, each having a sensor comprising:
- a double tube arrangement having
  - a first sensing tube vibrating in operation and
  - a second sensing tube vibrating in operation,
  - wherein the vibrating sensing tubes oscillate essentially oppositely in phase to one another, and
  - wherein at least one of the two sensing tubes is in communication with the pipe,
- an oscillations exciter for driving the sensing tubes, as well as
- oscillation sensors for registering inlet and outlet oscillations of the sensing tubes and for producing at least one mass-flow-influenced, electrical, sensor signal,
- wherein the oscillations exciter and/or the oscillation sensors have at least one magnetic circuit arrangement for transforming electrical energy into mechanical energy and/or vice versa,
- wherein the at least one magnetic circuit arrangement comprises
  - at least one coil attached to the first, vibrating, sensing tube of the sensor, at least at times carrying an electrical current, and at least at times traversed by a magnetic field, and connected by means of at least one pair of electrical leads with a measuring device electronics of the Coriolis mass flow meter, as well as
  - an armature attached to the second, vibrating, sensing tube of the sensor and interacting with the at least one coil.

The two sensing tubes are, as usual for such sensors, connected mechanically together by means of an inlet distributer piece and an outlet distributor piece, and/or by means of an inlet node plate and an outlet node plate.

Curved or straight sensor tubes of such sensors can, as is known, when excited in the so-called "useful mode" to bending oscillations of a first natural oscillation form, cause Coriolis forces in the fluid flowing therethrough. These, in turn, lead to a situation where bending oscillations of a so-called "Coriolis mode" are superimposed on the excited bending oscillations of the useful mode, and, because of this, the oscillations registered by means of the inlet and outlet oscillation sensors exhibit a measurable phase difference dependent on the mass flow rate.

Usually, the sensor tubes are excited in operation to an instantaneous resonance frequency, especially in the case where oscillation amplitude is regulated to be constant, such that they oscillate essentially perpendicularly to a longitudinal gravity line of the double-tube arrangement established by the two tubes. Since the resonance frequencies of the sensor tubes depend, among other things, also on the instantaneous density of the fluid, conventional Coriolis mass flow meters also permit the density of the flowing fluid to be measured, in addition to the mass flow rate.

In the case of magnetic circuit arrangements for the above-mentioned sensors, both the armature and the associated coil are always attached directly to the double-tube arrangement, so that, in operation, both follow the movements of the associated sensor tubes. This, in turn, means that the coil is repeatedly moving relative to a neighboring attachment location, where the electrical leads of the coil are intercepted on the sensor.

For preventing mechanical overloading of these leads, e.g. due to repeatedly arising or permanently alternating bending loads, special measures have already been realized, or discussed in the trade, for arranging the leads in conventional sensors.

Thus, to minimize the amplitudes of oscillatory movements of such electrical leads, they are usually held directly on the sensing tube, where the coil is fixed, and led along the same until reaching a clamping location, where the vibrating sensing tube is constrained such that it does not move during operation. In the case of double-tube arrangements having two sensing tubes traversed by fluid, the interception of the electrical supply lead can occur e.g. in the vicinity of the mentioned distributor pieces, which, as is known, divide the fluid flow into the two connected sensing tubes and then subsequently reunite such. Apart from the fact that, by placing the leads directly on the sensing tube, the tube oscillation properties can be influenced, such placement is not even possible, when the sensor is to be used for measuring high temperature fluids.

A further remedial possibility applicable also in the case of this problem, especially in high temperature applications, for preventing mechanical overloading of the electrical supply lead, especially in the case of sensors suited for fluids of high temperature, is e.g. described in U.S. Pat. No. 4,738,143 or 4,876,898. For the sensors disclosed there, which can serve, for example, even at temperature ranges above 400° C., the oscillatory movements of the electrical leads are relieved within a relatively short lead section by means of an elastically bending and electrically conducting spring element, which is inserted into the lead. Each spring element is coupled for this purpose at a first end both mechanically and electrically to the coil and at a second end non-conductively to a housing containing the sensor or to a supporting frame attached to the housing. Then, from the second end of the spring element serving here as an attachment point for the electrical supply lead, the supply lead, now practically fully uncoupled from the oscillations of the coil, is extended further in suitable manner, for example as a conductive rail and/or insulated wire.

Due to the operationally imposed, constant bending loading at mostly high temperatures, the spring elements must have a relatively high, largely temperature-independent elasticity, coupled with a very high resistance to aging. Nickel alloys are proposed as material for the spring elements. On the one hand, the spring elements must, namely, be stable over a long time period. On the other hand, however, the spring elements cannot be too difficult to bend, since, otherwise, an influencing of the bending oscillations of the sensing tubes, and, thus also, the sensitivity of the sensor to the parameter to be registered, becomes possible to an undesirably high extent. In order to be able to satisfy all these requirements together, at least approximately, especially also to attain the required reliability, the spring elements become comparatively expensive to manufacture. Then, there is the necessity for mounting them at very great technical effort onto the sensing tubes and, as mentioned above, onto the sensor housing, or the like.

Another possibility for avoiding overloading of the electrical supply leads is proposed, for example, in U.S. Pat. No. 5,349,872 and WO-A 02/088641. In the case of the sensors disclosed there, the coils provided for the magnetic circuit arrangement are secured by means of an elastically bendable mount attached to the sensing tubes of the particular double-tube arrangement in such a way that the coils stay in their static rest position in spite of the vibrating sensing tubes. Because of this, the electrical supply leads, too, only experience a negligibly small amount of oscillation-related bending loading during operation of the sensor. However, it has been found in the case of this kind of magnetic circuit arrangement that especially the sensor signals produced therewith can be considerably corrupted, a fact which can, on the one hand, be related to the way in which the magnetic field is channeled, but, on the other hand, can also be traced back to parasitic vibrations of the magnetic circuit arrangement itself.

SUMMARY OF THE INVENTION

An object of the invention is to improve the manner of securement and arrangement of the leads for magnetic circuit arrangements of a sensor of the described kind, especially those which can be used for fluids of high temperature, to the effect that the electrical supply leads exhibit a long life coupled simultaneously with a high and reliable number of cycles in fatigue testing, and that the securement itself is mechanically robust and of relatively simple construction, without decreasing the sensitivity of the sensor to the measured parameter to any extent worth mentioning.

For solving the object, the invention resides, in a first variant, in a magnetic circuit arrangement for converting electrical into mechanical energy and/or vice versa, which magnetic circuit arrangement comprises:
- a coil which is attached to an operationally vibrating, first sensing tube of a sensor and which carries an electrical current during operation,
  - wherein the coil is electrically connected by means of at least one pair of electrical leads to a measuring device electronics of the sensor,
- an armature of magnetic material attached to an operationally vibrating, second sensing tube of the sensor,
- wherein coil and armature interact with one another by way of a magnetic field, and
- a mount, attached to the first sensing tube by means of at least one resilient first arm and to the second sensing tube by means of at least one resilient second arm, for electrical leads connected with the magnetic circuit arrangement,
  - wherein the two arms are mechanically connected together remotely from the sensing tubes, and
  - wherein the at least one pair of leads electrically connected with the coil is attached to one of the two arms of the mount.

Additionally, the invention resides, in a second variant, in a mount for electrical leads to a vibration-type sensor and/or for coils provided for a vibration-type sensor, which mount comprises:
- at least one resilient first arm attached to a first sensing tube of a sensor and
- at least one resilient second arm attached to a second sensing tube of the sensor,
- wherein the two sensing tubes, which vibrate during operation of the sensor, form a double-tube arrangement having a longitudinal gravity line, which lies in an imaginary central plane extending between the two, preferably parallel, sensing tubes, and the two arms of the mount are connected essentially rigidly to one another at a sensing-tubes-far, connecting location in such a way,
  - that the mount exhibits a first eigenmode of predetermined mechanical resonance frequency, in which the first arm attached to the first sensing tube and the second arm attached to the second sensing tube oscillate pendularly essentially perpendicular to the central plane of the double-tube arrangement, and
  - that the mount exhibits a second eigenmode of predetermined mechanical resonance frequency, in which the first arm attached to the first sensing tube and the second arm attached to the second sensing tube oscillate pendularly essentially parallel to the central plane of the double-tube arrangement, and
- wherein the resonance frequency of the first eigenmode is different from the resonance frequency of the second eigenmode.

Furthermore, the invention resides, in a third variant, in a mount for electrical leads to a vibration-type sensor and/or for coils provided for a vibration-type sensor, which mount comprises:
- at least one resilient first arm attached to a first sensing tube of a sensor and
- at least one resilient second arm attached to a second sensing tube of the sensor,
- wherein the two sensing tubes are excited during operation of the sensor to mechanical oscillations in a useful mode in a manner such that they oscillate essentially in opposite phase to one another,
- wherein the two arms of the mount are connected to one another essentially rigidly at a connecting location remote from the two sensing tubes, and
- wherein the mount exhibits a first eigenmode having a mechanical resonance frequency, which is lower, preferably by 10% or more, than a lowest mechanical resonance frequency of the sensing tubes oscillating in the useful mode.

According to a fourth variant, the invention resides in a magnetic circuit arrangement for converting electrical into mechanical energy and/or vice versa, which magnetic circuit arrangement comprises:
- an armature of magnetic material attached to an operationally vibrating sensing tube of a vibration-type sensor,
- a coil carrying an electrical current during operation of the sensor and interacting with the armature by way of a magnetic field,
  - wherein the coil comprises a coil wire wound on an electrically non-conductive, preferably cylindrical, coil body and the coil wire is electrically connected by means of at least one pair of electrical leads to a measuring device electronics of the sensor, and wherein the coil body of the at least one coil has an outer screw thread, in which the coil wire is seated, preferably in one-ply.

In a first development of the invention, at least the arms of the mount comprise a material of linear coefficient of thermal expansion smaller than $17 \times 10^{-6}$/K.

In a second development of the invention, the mount further includes a resilient third arm attached to the first sensing tube and at least one resilient fourth arm attached to the second sensing tube.

In a third development of the invention, the two sensing tubes oscillate during operation, at least at times, in a useful mode with a mechanical resonance frequency, preferably in opposite phase to one another.

In a fourth development of the invention, the sensor is used as a mass flow sensor for a fluid flowing in a connected pipe, wherein the fluid to be measured during operation of the sensor is allowed to flow through at least one of the two sensing tubes.

In a fifth development of the invention, the sensor is used as a density sensor for a fluid flowing in a connected pipe, wherein the fluid to be measured during operation of the sensor is allowed to flow through at least one of the two sensing tubes.

In a sixth development of the invention, the sensor is used as a viscosity sensor for a fluid flowing in a connected pipe, wherein the fluid to be measured during operation of the sensor is permitted to flow through at least one of the two sensing tubes.

In a seventh development of the first variant, the outer screw thread has a pitch which is greater than the wire diameter of the coil wire.

In an eighth development of the first variant development of the first variant, the at least one pair of leads electrically connected with the coil is attached adhesively to the mount.

In a ninth development of the first variant, the at least one pair of leads electrically connected with the coil is embedded in an insulating layer, which is applied on the one arm of the mount.

In a tenth development of the first variant, the at least one pair of leads electrically connected with the coil is fixed to the mount by means of a glass layer.

In an eleventh development of the first variant, the at least one pair of leads electrically connected with the coil is fixed to the mount by means of a ceramic layer.

In a twelfth development of the first variant, the at least one pair of leads electrically connected with the coil is fixed to the mount by means of an enamel layer.

In a thirteenth development of the first variant, the at least one pair of leads electrically connected with the coil is fixed to the mount by means of a resin.

In a fourteenth development of the first variant, the at least one pair of leads electrically connected with the coil is fixed to the mount by means of an adhesive.

In a fifteenth development of the first variant, the at least one pair of leads electrically connected with the coil is fixed to the mount along a curved, preferably meandering, path.

In a sixteenth development of the first variant of the invention, the magnetic circuit arrangement serves as an oscillations exciter of the sensor for driving the sensing tubes.

In a seventeenth development of the first variant of the invention, the magnetic circuit arrangement serves as an oscillations pick-up of the sensor for registering oscillations of the sensing tubes.

In a seventh development of the second or third variant, the resonance frequency of the first eigenmode is set at more than 50% higher than the resonance frequency of the sensing tubes oscillating in the useful mode.

In an eighth development of the second or third variant, the resonance frequency of the first eigenmode is chosen greater than 50 Hz.

In a ninth development of the second variant, the resonance frequency of the first eigenmode is set lower than the resonance frequency of the second eigenmode.

In a tenth development of the second variant, the two sensing tubes are excited to mechanical oscillations during operation of the sensor, such that they oscillate in a useful mode in opposite phase to one another, and the first eigenmode has a lowest resonance frequency, which is less than a lowest oscillation frequency of the sensing tubes oscillating in the useful mode.

In a first development of the fourth variant of the invention, the coil additionally has a protective layer, which covers the coil wire wound on the coil body and is made of an electrically non-conductive material.

In a second development of the fourth variant of the invention, the coil body comprises a ceramic material.

In a third development of the fourth variant of the invention, the coil body comprises a glassy material.

In a fourth development of the fourth variant of the invention, the protective layer comprises a ceramic material.

In a fifth development of the fourth variant of the invention, the protective layer comprises a glassy material.

A basic idea of the invention is that, on the one hand, at least one of the magnetic circuit arrangements usually used for such sensors, especially Coriolis mass flow sensors or also Coriolis mass flow/density sensors, is so constructed, that its electrical leads are exposed during operation only to relatively small mechanical loads. On the other hand, the invention is directed to providing a magnetic circuit arrangement that is largely insensitive to temperature influences and whose electrical leads and even also coils arranged closely to high-temperature sensing tubes are largely temperature resistant. Beyond this, an additional basic idea of the invention is to construct a magnetic circuit arrangement mechanically in such a way that any possible oscillatory movements of the same have no or only a very small influence on the measurement signals produced by means of the sensor.

The mount of the invention, as well as the magnetic circuit of the invention, are especially suited for application in vibration-type sensors, especially for application in the electromechanical oscillation exciters or electrodynamic oscillation sensors that are usually arranged directly on the operationally vibrating sensing tubes of such sensors.

BRIEF DESCRIPTION OF THE DRAWINGS

The invention and additional advantages will now be explained on the basis of examples of embodiments shown in the figures of the drawing. Equal parts are provided in the figures with equal reference characters. In cases where it is helpful for clarity, reference characters already used in previous figures are omitted in subsequent figures.

FIG. 1 shows in perspective a vibration-type sensor having a double-tube arrangement, FIG. 6b shows in a sectional side view a portion of the coil of FIG. 6a.

DETAILED DESCRIPTION OF EXEMPLARY EMBODIMENTS

Figure 2A:
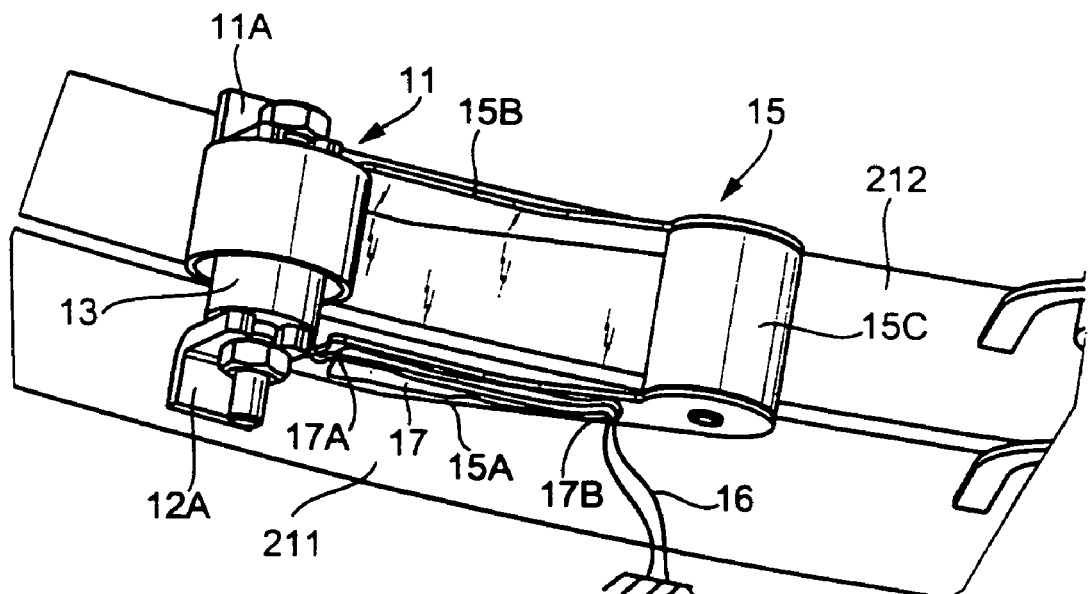
FIG. 2a shows in perspective a first variant of a magnetic circuit arrangement especially suited for a sensor as shown in FIG. 1 and attached by means of a mount to a double-tube arrangement as shown in FIG. 1.

While the invention is susceptible to various modifications and alternative forms, exemplary embodiments thereof have been shown by way of example in the drawing and will herein be described in detail. It should be understood, however, that ther is not intent to limit the invention to the particular forms disclosed, but, on the contrary, the intention is to cover all modifications, equivalents, and alternatives falling within the spirit and scope of the invention as defined by the intended claims.

FIG. 1 shows an example of an embodiment of a vibration-type sensor, especially a Coriolis mass flow sensor, a Coriolis mass flow/density sensor, or also a viscosity/density sensor, or the like, which, by way of example, can be used for measuring a mass flow rate, a density and/or a viscosity of a fluid flowing in a pipe (not shown). Such a sensor serves, applied as a physical-electrical transducer in a corresponding measuring device, as is known, for the purpose of producing in the traversing fluid Coriolis forces, inertial forces and/or frictional forces, as well as for sensing the reactions resulting from these forces and for converting them into electronically evaluatable signals.

For conducting the fluid to be measured, the sensor includes a double-tube arrangement 21 formed by means of a first sensing tube 211 and a preferably identically shaped, second sensing tube 212. The sensing tubes 211, 212 can, as is usual in such sensors, be simply curved, e.g. U-shaped or V-shaped, or even curved into a loop; if required, they can also be straight. As shown in FIG. 1, the double-tube arrangement 21 is, furthermore, held for oscillation in a supporting frame 25, which happens to be cylindrical in this case.

The sensing tubes 211, 212 are, as also shown in FIG. 1, so oriented with respect to one another, that an imaginary central plane $E_1$ extending between the two, preferably parallel, sensing tubes 211, 212 corresponds practically to a first plane of symmetry of the double-tube arrangement 21. Beyond this, the double-tube arrangement 21 has a longitudinal gravity line, which lies in the imaginary central plane $E_1$ extending between the two, preferably parallel, sensing tubes 211, 212 and essentially corresponds to a first principal axis of inertia of the double-tube arrangement 21. Furthermore, the double-tube arrangement 21 is advantageously so formed, that it has an imaginary second plane of symmetry $E_2$, which intersects the central plane $E_1$ as accurately as possible such that also a second principal axis of inertia H of the double-tube arrangement 21 lies in this second plane of symmetry $E_2$, perpendicular to the above-mentioned, first principal axis of inertia.

For the case in which both sensing tubes 211, 212 are to be traversed during operation by the fluid to be measured, corresponding distributor pieces are provided, in manner known to those skilled in the art, at the inlet and outlet ends of the two sensing tubes 211, 212. The distributor pieces, which are not shown here, are connected in the installed measuring device to straight inlet and outlet sections of the pipe carrying the fluid and, consequently, as usual for such sensors, aligned preferably with one another and with a longitudinal axis L passing through both of them. Advantageously, the two distributor pieces can be inserted in the corresponding ends of the support frame 25 or even integrated therein. For the case where the sensor is to be releasably mounted in the pipe, then the inlet distributer piece is provided with a first flange 215 and the outlet distributor piece with a second flange 216; if required, however, the distributor pieces can also be directly connected with the pipe, e.g. by means of welding or brazing.

For the other case, where only one of the two sensing tubes 211, 212 is to be traversed during operation by the fluid, the two flanges 215, 216 can, as shown, for example in the U.S. Pat. No. 5,549,009 or in the WO-A 02/099363, be coupled with the chosen one of the two sensing tubes 211, 212 by means of inlet and outlet, tubular connecting pieces provided on the inlet and outlet ends.

During operation of the sensor, the sensing tubes 211, 212 are, as already mentioned, excited in the useful mode to bending oscillations, preferably at a natural resonance frequency of an eigenmode of the sensing tubes 211, 212, and, indeed, such that, as usual in the case of such sensors, the sensing tube 211 vibrates oppositely in phase to the sensing tube 212. The Coriolis forces induced by this in the traversing fluid cause, as is known, additional mechanical oscillations, also referenced as the Coriolis mode, which depend on the mass flow rate m to be measured and are so superimposed on the excited oscillations of the useful mode that the sensing tubes 211, 212 are asymmetrically, elastically deformed.

If required, any mechanical stresses caused by the vibrating sensing tubes 211, 212 at the inlet and outlet in the distributor pieces can be minimized e.g. by connecting the sensing tubes 211, 212 mechanically together, as usual for such sensors, at the inlet end by means of at least one first node plate 217 and at the outlet end by means of at least one second node plate (not shown). Additionally, mechanical resonance frequencies of the double-tube arrangement 21 can be purposefully influenced by means of the node plates.

For driving the sensing tubes 211, 212, the sensor includes at least one oscillations exciter 22. This serves for converting an electrical exciting energy $E_{exc}$, fed from a measuring device electronics (not shown) connected to the sensor, into exciting forces $F_{exc}$, e.g pulsating or harmonic, which act on the sensing tubes 211, 212 symmetrically, thus simultaneously and uniformly, but with opposite sign and, consequently, produce the oppositely phased oscillations of the sensing tubes 211, 212. The exciting forces $F_{exc}$ can, in manner known to those skilled in the art, e.g. by means of a current and/or voltage control circuit provided in the measuring device electronics, be adjusted in amplitude and, e.g. by means of a correspondingly provided phase control loop, in frequency. See, in this connection, also the U.S. Pat. No. 4,801,897.

For registering oscillations of the vibrating sensing tubes 211, 212, the sensor has, additionally, a first oscillations sensor 23 on the inlet side and a second oscillations sensor 24 on the outlet side. These two oscillation sensors 23, 24 react to movements of the sensing tubes 211, 212, especially lateral deviations, and deliver corresponding first and second oscillation signals $S_{23}$, $S_{24}$ to the measuring device electronics.

FIGS. 2a to 4 are examples of a magnetic circuit arrangement suitable for use in the above-described sensor for converting electrical into mechanical energy and/or, based on the law of induction, for converting mechanical into electrical energy. Thus, the magnetic circuit arrangement of the invention can serve, on the one hand, as oscillation sensors 23, 24 registering mechanical oscillations, and, on the other hand, as oscillations exciter 22 producing mechanical oscillations.

Figure 6A:
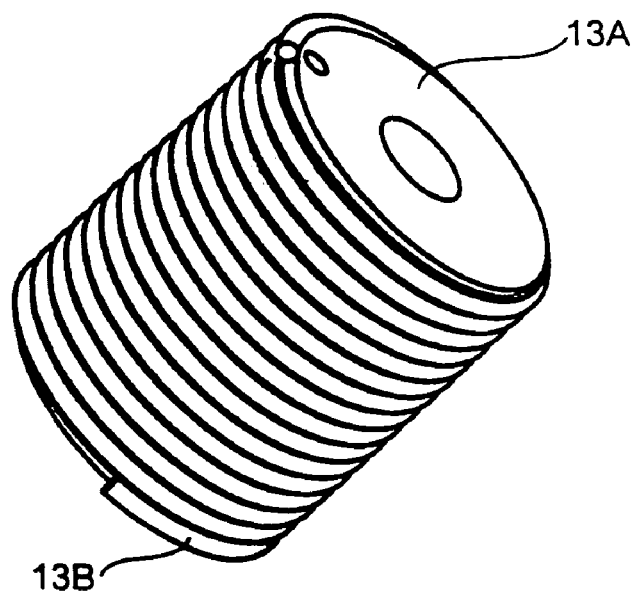
FIG. 6a shows in perspective a portion of a coil usable in a sensor of FIG. 1.
Figure 6B:
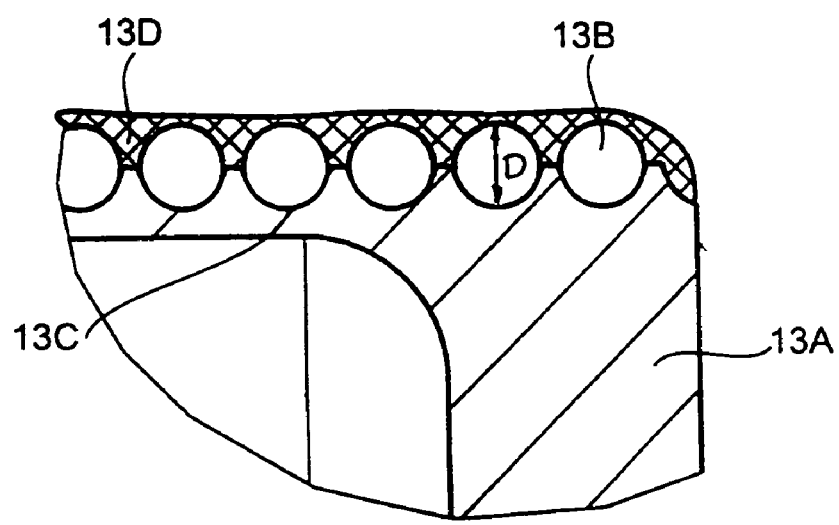

For converting mechanical into electrical energy, or vice versa, the magnetic circuit arrangement has at least one, preferably cylindrical, coil 13, which carries an electrical current during operation and which is electrically connected with the measuring device electronics of the sensor by means of at least one pair of electrical leads 16. Coil 13 includes, as shown schematically in FIG. 6a, an electrically non-conductive, preferably cylindrical, coil body 13A, on which a coil wire 13B, electrically connected with the measuring device electronics by means of at least one pair of electrical leads 16, is wound. In an embodiment of the invention, the coil body 13A is made of a ceramic and/or glassy material, especially such materials having high-temperature resistance. In a further embodiment of the invention, the coil wire 13B is made of a noble metal, especially a gold, silver and/or platinum alloy, or the like.

Additionally, the magnetic circuit arrangement includes at least one armature 11 fixed to the sensing tube 211 and interacting during operation with the current-carrying coil 13 by means of a magnetic field. Preferably, the armature 11 is made, at least in part, of a hard-magnetic, thus pre-magnetizable, material, such as e.g. AlNiCo, NdFeB, SmCo or another rare-earth alloy. However, the material for the armature 11 can also be free-cutting steel or structural steel, which are more favorable with respect to cost. As shown in FIG. 2a, the armature 11 is mounted on the double-tube arrangement 21 by means of a bending-resistant, first angle-piece 11A attached to the sensing tube 211. The angle-piece 11A can e.g. be welded or brazed to the sensing tube 211.

The magnetic circuit arrangement is preferably of the electrodynamic type, thus a magnetic circuit arrangement in which an electrical conductor formed into a conductor loop, e.g. the coil 13, is traversed preferably perpendicularly by a magnetic filed produced by means of at least one permanent magnet, here the armature 11, and in which the conductor loop and permanent magnet are moved relative to one another. The magnetic circuit arrangement can, however, also be of the electromagnetic type, thus a magnetic circuit arrangement, in which two ferromagnetic bodies movable relative to one another are so arranged with respect to one another that at least one variable air gap formed between the two is traversed by a preferably homogenized magnetic field of high flux density. See, in this connection, especially also the EP-A 803 713.

For homogenizing the magnetic fields produced with the magnetic circuit arrangement and for achieving the highest possible flux density, especially also outside of the armature 11, the armature 11 can, for example, be embodied in the form of a beaker, whose beaker floor is in the form of a preferably hard-magnetic rod extending coaxially to the wall of the beaker. Beyond this, the armature can be made, for instance in the region of the already mentioned beaker wall and as is usual for such magnetic circuit arrangements, at least in part of soft-magnetic materials, such as ferrite, Corovac, or the like. Additionally, the coil 13 can be placed in a coil beaker, which is preferably oriented coaxially to the coil 13, for purposes of conducting the magnetic fields.

Besides the at least one coil 13 and the at least one armature, the magnetic circuit arrangement includes also a mount 15, which serves for mechanically connecting the electrical leads of the sensor, especially of the magnetic circuit arrangement itself, and/or the at least one coil 13, to the double-tube arrangement 21.

Figure 2B:
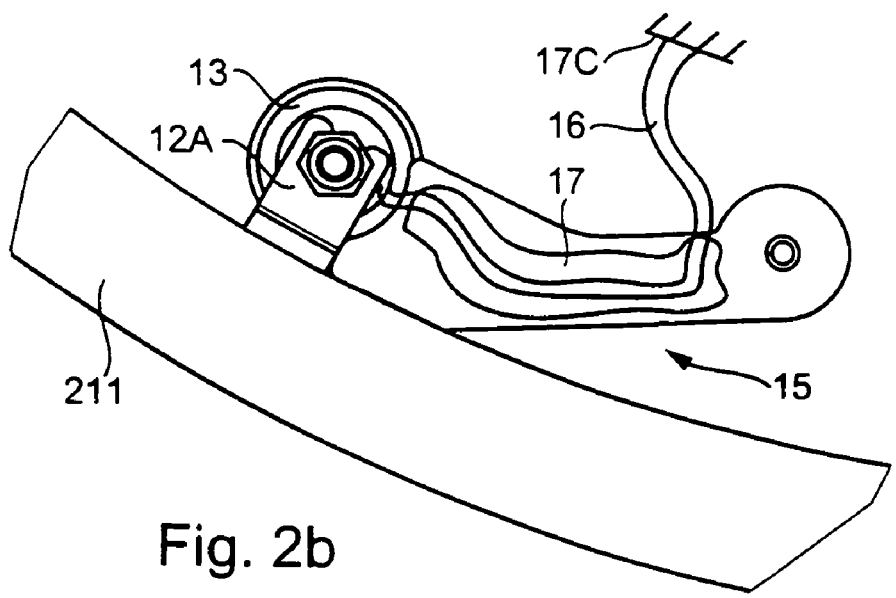
FIG. 2b shows the magnetic circuit arrangement of FIG. 2a in side view.

As shown in FIGS. 2a, 2b, the mount 15 for this purpose is attached with a first arm 15A to the first sensing tube 211 and with an essentially identical or, however, also mirror-symmetrically formed, second arm 15B to the second sensing tube 212. Additionally, the two, preferably resilient, arms 15A, 15B are connected with one another, preferably rigidly, at their far ends from the double-tube arrangement 21 by way of a, for example rod- or plate-shaped, connecting element 15C in such a way that a thus-constructed connecting location of the two arms 15A, 15B is spaced both from the sensing tubes 211, 212 and from the supporting frame 25.

For the case where the sensing tubes 211, 212 vibrate in the above-described manner with opposite phase relative to one another, the mount 15 is, indeed, deformed, especially by an outwards bending of the arms 15A, 15B secured to the sensing tubes 211, 212, yet their axis of symmetry essentially retains its position relative to the central plane $E_1$. Consequently, the connecting element 15C secured by way of arms 15A, 15B to the double-tube arrangement 21 also always remains in an essentially constant rest position.

In a first variant of the invention, the coil 13 is secured on the sensing tube 212. As shown in FIG. 2a or 2b, the coil 13 in this first variant of the invention can be mounted on the double-tube arrangement by means of a second angle-piece 12A rigidly fixed to the sensing tube 212, for example by welding or soldering. In the case of this first variant of the invention, the mount 15 serves for so fixing the pair of electrical leads 16 of the magnetic circuit arrangement that the oscillations transferred to the lead from the coil 13, which must move during operation, are almost completely removed over the course of a relatively short length of lead, so that the mechanical breakage resistance of the two leads is essentially maintained or, as much as possible, not exceeded by the acting mechanical forces.

For this purpose, the at least one pair of leads 16 electrically connected with the coil 13 is attached to one of the two arms 15A, 15B, preferably to the arm 15A lying nearest to the coil 13, and, indeed, in such a manner that the two leads are brought from a first attachment point 17A on arm 15A, or 15B, as the case may be, preferably located near to the coil 13, along the arm 15A, or 15B, to a second attachment point 17B near to or at connecting element 15C. Advantageously, the two leads are additionally attached, preferably completely, to the arm 15A, or 15B, also between the two attachment points.

For buffering any possible thermally-related expansion of the mount 15, the leads in one embodiment of the invention are attached to the arm 15A, or 15B along a curved, preferably arc-shaped or meandering, path.

The securement of the leads can be accomplished in advantageous manner adhesively, for example using a temperature-resistant adhesive or a resin. The leads can also be attached to the mount 15, in advantageous manner, by embedding them in a thermally insulating, especially temperature-resistant, layer 17, as shown schematically in the FIGS. 2a, 2b, applied on the arm 15A, or 15B. This accomplishes, on the one hand, that a stable, long-lasting attachment of the leads 16 can be created in very simple manner. On the other hand, use of an electrically insulating material for the embedding layer means that, in the area of the mount 15, a relatively less durable material can be chosen for the insulation of the lead, or the leads can even be bare wire. The insulating layer 17 can be, for example, an appropriately applied glass- or a glass-solder-layer, ceramic layer or enamel layer or the like.

Leaving the second attachment point 17B, the leads are brought in advantageous manner, preferably freely extending, to a third attachment point 17C provided on the supporting frame 25. Disregarding possible thermally-related length changes, the distance between these two attachment points remains essentially constant, even when the coil 13 is moving in the above-described manner. The third attachment point 17C can, as also shown schematically in FIG. 1, be realized, for example, by means of a clamp block mounted on the supporting frame 25.

The described emplacement of the leads 16 assures, on the one hand, that each of these leads moves adequately within a predetermined region, namely between the first and the second attachment points 17A, 17B, and, on the other hand, that, despite a continually present alternating loading present there, neither is exposed to bending stresses to an unacceptably high degree.

In another embodiment of the invention, the coil wire 13B and the pair of electrical leads 16 connected thereto are present, at least in the region of the insulating layer 17, as one piece, thus as a single, continuous, electrical line.

The mount 15 can be manufactured either as one piece, e.g. as a stamped-bent part, or as multiple pieces. Material for the mount 15 can e.g. be the same as used for the sensing tubes 211, 212. Preferably, however, the mount 15 is made of a material having a linear coefficient of thermal expansion less than $17 \times 10^{-6} \text{ K}^{-1}$, when the sensor is used for high fluid temperature ranges of above 250° C.

In order to avoid an influencing of the oscillation form of the vibrating sensing tubes 211, 212 by the mount 15, such should be appropriately flexible. To this end, the arms 15A, 15B can be made of appropriately thin strips of sheet material, to allow them to oscillate sympathetically during operation. Also for such purposes, one embodiment of the invention provides that the connecting element 15A is held within the sensor solely by means of the two arms 15C, 15B.

Figure 3:
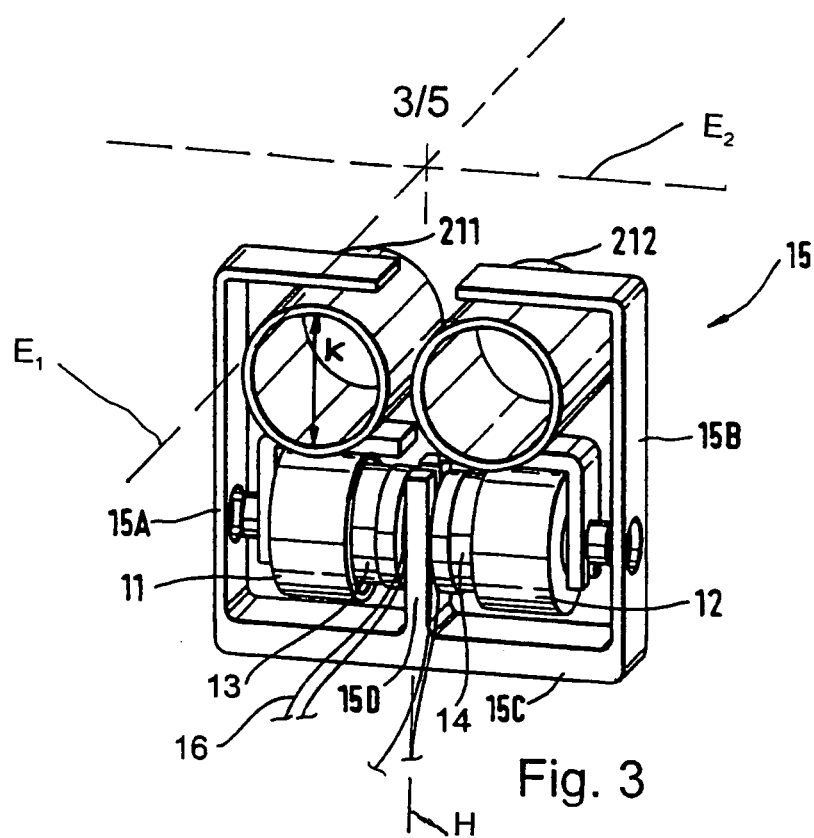
FIG. 3 shows in perspective a second variant of magnetic circuit arrangement especially suited for a sensor as shown in FIG. 1.

In a second variant of the invention, the mount 15 is used, as also shown, for example, in U.S. Pat. No. 5,359,872 or WO-A 02/088641, to mount the at least one coil 13 of the magnetic circuit arrangement to the double-tube arrangement 21. In this variant of the invention, the magnetic circuit arrangement can additionally include, as shown in FIG. 3 or 4, a second coil 14, which correspondingly interacts then with a second armature 12 attached to the sensing tube 212.

Additional investigations in this connection have shown that the use of the mount 15, both in the above-described manner for securing the coils provided for the magnetic circuit arrangement to the double-tube arrangement 21 and in the additionally above-described manner for the attachment of electrical leads, places high demands on the precision with which the whole magnetic circuit arrangement is manufactured and with which such is subsequently secured to the double-tube arrangement 21. Especially, care must be given to maintaining, with as great accuracy as possible, the earlier-mentioned symmetry conditions, particularly with reference to the first and second symmetry planes $E_1$, $E_2$.

Additionally, it also has been recognized by the inventors that, besides obtaining as high a degree of symmetry as possible in the construction of the sensor, the mechanical oscillation behavior of the mount 15 also still has to be matched to that of the double-tube arrangement 21.

The mount 15 itself has, namely, a first eigenmode with a predeterminable, mechanical resonance frequency $f_1$, at which the two arms 15A, 15B attached, respectively, to the sensing tubes 211, 212 oscillate essentially in phase with one another.

In this first eigenmode, the two arms 15A, 15B each are moved in the manner of a pendulum about a first fixed point of the mount 15 formed at the associated sensing tube 211, respectively about a second fixed point of the mount 15 formed at the associated sensing tube 212, and, indeed, in a manner such that the two arms 15A, 15B oscillate essentially perpendicularly to the central plane $E_1$ of the double-tube arrangement 21.

Beyond this, the mount has yet a second eigenmode with a predeterminable, mechanical resonance frequency $f_2$, at which the two arms 15A, 15B again oscillate essentially in phase, but, here, the movement is essentially parallel to the central plane $E_1$ of the double-tube arrangement 21.

Figure 5:
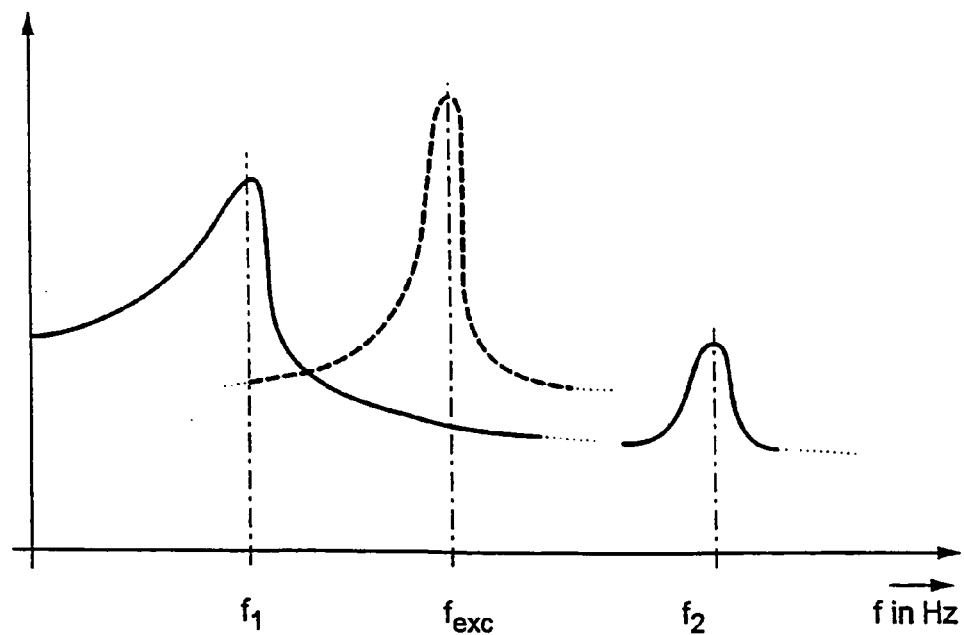

According to the invention, each of the spring stiffnesses and masses of the mount 15 effective for the two eigenmodes are so dimensioned that the resonance frequency $f_1$ of the first eigenmode is different from the resonance frequency $f_2$ of the second eigenmode, this, in fact, being the situation shown in FIG. 5. In one embodiment of the invention, the resonance frequency $f_1$ of the first eigenmode is selected to be smaller than the resonance frequency $f_2$ of the second eigenmode. Preferably, the resonance frequency $f_1$ is so chosen that it is 90% or less than the resonance frequency $f_2$.

In the case of the examples of embodiments illustrated in FIG. 2a or 3, especially the spring stiffnesses of the two arms 15A, 15B individually active in each oscillation direction must be taken into consideration, while the connection element 15C with the possibly attached coils deliver a significant contribution to the effective masses. The individual spring stiffnesses effective for the two eigenmodes of the mount 15 and, thus also, the separate mechanical resonance frequencies $f_1$, $f_2$ of the mount 15 can e.g. be made different from one another in easy manner by giving each of the two arms 15A, 15B, as illustrated in FIG. 3, a width that is significantly larger than the thickness of such arm.

Figure 4A:
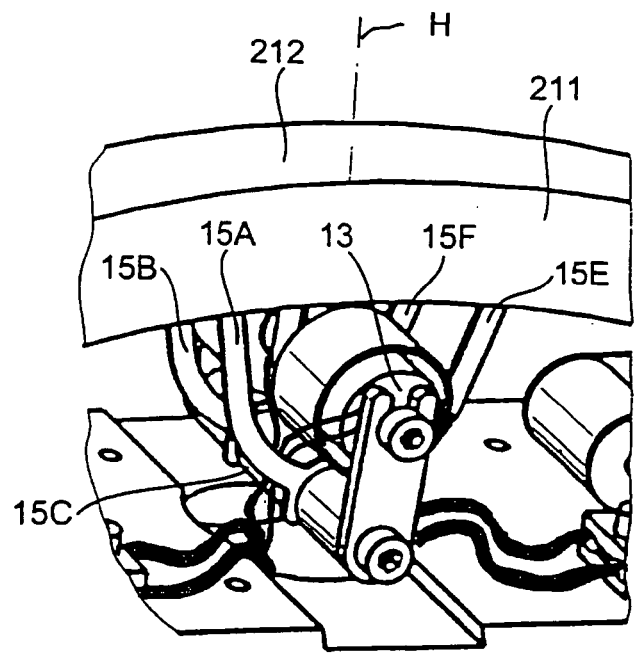
FIG. 4a shows in perspective a third variant of a magnetic circuit arrangement especially suited for a sensor as shown in FIG. 1.

In another embodiment of the invention, the mount includes, as shown in FIG. 4a, additionally a resilient third arm 15E fixed to the first sensing tube 211 and at least one resilient fourth arm 15F fixed to the second sensing tube 212, with the two arms 15E, 15F, which especially serve for increasing the resonance frequency $f_2$, being mechanically coupled likewise by means of the connecting element 15C to one another, as well as to the two other arms 15A, 15B.

In a third variant of the invention, the mount 15 is so dimensioned that the mechanical resonance frequency $f_1$ of its first eigenmode is less than a lowest mechanical resonance frequency of the sensing tubes 211, 212 oscillating in the useful mode, which, in turn, can be equal to an instantaneous exciter frequency $f_{exc}$ of an exciter current fed to the oscillations exciter 22. See FIG. 5 in this connection.

In an embodiment of the second or third variant of the invention, for the prevention of, especially harmonic, excitements of the first eigenmode, its resonance frequency $f_1$ is so chosen, that it is 90% or less than a lowest mechanical resonance frequency of the sensing tubes 211, 212 oscillating in the useful mode, or, stated differently, that it is 10%, or more, lower than that lowest mechanical resonance frequency of the sensing tubes oscillating in the useful mode. Furthermore, it has been found in this connection that for preventing also subharmonic excitements of the first eigenmode, its resonance frequency $f_1$ is advantageously so chosen or set, that it lies as much as possible above 50% of the lowest mechanical resonance frequency of the sensing tubes 211, 212 oscillating in the useful mode and/or above 50% of the exciter frequency $f_{exc}$.

In another embodiment of the second or third variant of the invention, the resonance frequency $f_1$ of the first eigenmode is chosen greater than 50 Hz, so that, also in the range of usual line alternating voltages, a certain frequency separation from possible line-voltage-related or line-controlled, interference influences is created.

Figure 4B:
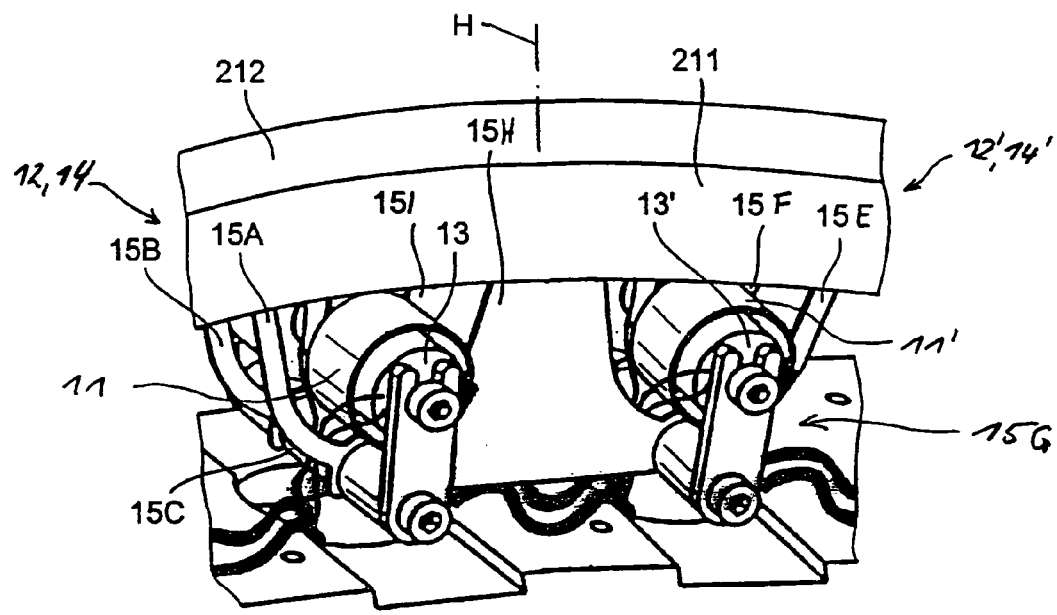
FIG. 4b shows in perspective an advantageous further development of the magnetic circuit arrangement of FIG. 4a, FIG. 5 shows schematically, by way of example, a selection of mechanical resonance frequencies that are measurable at the sensor of FIG. 1.

FIG. 4b shows another embodiment of the magnetic circuit arrangement. This embodiment is especially advantageous for use of sensing tubes of caliber $K \geq 40$ mm and/or for use of the sensor in high temperature ranges with fluid temperatures of over 250° C., particularly for its application as oscillations exciter 22. High temperatures within the sensor create, along with the above-described high thermal and/or thermo-mechanical loadings of the sensing tubes 211, 212 or the electrical leads arranged in the sensor, for example the leads 16, also significant heating of the armatures attached practically directly on the sensing tubes 211, 212. Because of this, such applications with extremely high temperatures at the sensing tubes 211, 212 have to go, in some cases, without the use of the high permeability and, consequently, otherwise very well suited, SmCo compounds. To avoid the use of disproportionately large installation dimensions for the magnetic circuit arrangement due to the forced, lower magnetic conductivity of the magnetic materials usable for such high-temperature applications, such as e.g. more temperature-resistant AlNiCo-compounds, and/or due to the larger caliber K of the sensing tubes, a further development of the second or third variant of the invention provides, in addition to the two armature-/coil-pairs 11, 13, and 12, 14, two more armature-/coil-pairs 11', 13', and 12', 14', which are each constructed essentially equally to the two other armature-/coil-pairs 11, 13, and 12, 14 (the armature-/coil-pair 12, 14 and the armature-/coil-pair 12', 14' are hidden in FIG. 4b). For keeping symmetry, especially with respect to the first and second symmetry planes $E_1$, $E_2$, each of the two armature-coil pairs 11, 13, 11', 13', respectively 12, 14, 12', 14', neighboring in the direction of the above-mentioned longitudinal gravity line of the double-tube arrangement, are arranged at equal distance from the second principal axis of inertia. Moreover, it has proven advantageous in this connection to arrange the two armature-coil pairs 11, 13, 11', 13', respectively 12, 14, 12', 14', neighboring in the direction of the longitudinal gravity line as close as possible to the middle and, thus, as near as possible to one another, in order to avoid, as much as possible, an unwanted exciting of undesired oscillation modes.

For the attachment of the two additional armature-/coil-pairs 11', 13', and 12', 14' in the above-described manner, the connecting element 15C is given essentially a plate shape, and, indeed, in such a manner that it offers sufficient space for arranging and securing the four armature-/coil-pairs used in this embodiment. Alternatively, an additional connecting element 15G essentially identical to the essentially rod-shaped connecting element 15C can be provided in the mount 15. This connecting element 15G is, as evident from FIG. 4b, spaced from the sensing tubes 211, 212, as well as from the connecting element 15C, and correspondingly attached to the two arms 15E, 15F, while extending essentially parallel to element 15C. Moreover, for improving its stability, the mount 15 can have, in addition to the arms 15A, 15B, 15E, 15F, a fifth arm 15H, which, as shown in FIG. 4b, is attached centrally to the sensing tube 211 and connected at its end far from the sensing tube 211 with the two arms 15A, 15E, as well as a sixth arm 15I attached in the same manner centrally on the sensing tube 212 and connected analogously at its end far from the sensing tube 212 with the two arms 15B, 15F.

For further improvement of the temperature resistance of the coils, along with an increasing of their mechanical strength, the coil body 13A of the at least one coil 13 has, in a fourth variant of the invention, an outer screw thread 13C, into which the coil wire 13B is laid, so that it is seated therein, preferably in one ply. In this connection, it has, moreover, proved to be advantageous to choose a pitch of the outer screw thread 13C greater than the wire diameter D of the coil wire 13B.

Additionally, in an advantageous embodiment of this fourth variant of the invention, the coil 13 has a protective layer 13D, composed of an electrically non-conductive material, coating the coil wire 13B wound on the coil body 13A. In this connection, the coil wire 13B can also be an insulation-free, bare wire. In an advantageous further development of the invention, the protective layer 13D is formed of a preferably high-temperature resistant, ceramic and/or glassy material.

While the invention has been illustrated and described in detail in the drawings and foregoing description, such illustration and description is to be considered as exemplary and not restrictive in character, it being understood that only exemplary embodiments have been shown and described and that all changes and modifications that come within the spirit and scope of the invention as described herein are desired to be protected.

What is claimed is:

1. A mount for electrical leads to a vibration-type sensor including a first sensing tube and a second sensing tube, and/or for coils provides for a vibration-type sensor, which mount comprises:
   at least one resilient first arm attached to the first sensing tube of the sensor; and
   at least one resilient second arm attached to the second sensing tube of the sensor, wherein:
   the two sensing tubes form a double-tube arrangement having a longitudinal gravity line, which lies in an imaginary central plane extending between the two, preferably parallel, sensing tubes, and the two arms of the mount are connected to one another at a sensing-tubes-far, connecting location in such a way, that:
   the mount exhibits a first eigenmode of predeterminable mechanical resonance frequency, $f_1$, in which said at least on resilient first arm attached to the first sensing tube and said at least on resilient second arm attached to the second sensing tube oscillate pendularly essentially perpendicular to the central plane of the double-tube arrangement; and
   the mount exhibits a second eigenmode of predetermined mechanical resonance frequency, $f_2$, in which said at least on resilient first arm attached to the first sensing tube and said at least on resilient second arm attached to the second sensing tube oscillate pendularly essentially parallel to the central plane of the double-tube arrangement; and
   said resonance frequency, $f_1$, of said first eigenmode is different from said resonance frequency, $f_2$, of said second eigenmode.

2. The mount as claimed in claim 1, wherein:
   said fist and second sensing tubes oscillate during operation, at least at times, in a useful mode with a mechanical resonance frequency, preferably in opposite phase to one another.

3. The mount as claimed in claim 1, wherein:
the resonance frequency of said first eigenmode is set to be more than 50% higher than the resonance frequency of said sensing tubes oscillating in the useful mode.

4. The mount as claimed in claim 1, wherein said resonance frequency, $f_1$, of said first eigenmode is set lower than the resonance frequency, $f_2$, of said second eigenmode.

5. The mount as claimed in claim 1, wherein said resonance frequency, $f_1$, of said first eigenmode is chosen to be greater than 50 Hz.

6. The mount as claimed in claim 1, wherein:
said at least one resilient first arm and said at least one resilient second arm comprise a material having linear coefficient of thermal expansion smaller than $17 \times 10^{-6}/K$.

7. The mount as claimed in claim 1, comprising:
a resilient third arm attached to said first sensing tube and at least one resilient fourth arm attached to said second sensing tube.

8. The mount as claimed in claim 1, wherein:
the mount serves for mounting at least two coils to sensing tubes of a vibration-type sensor, which vibrate at least at times.

9. A mount for electrical leads to a vibration-type sensor including a first sensing tube and a second sensing tube, and/or for coils provided for a vibration-type sensor, which mount comprises:
at least one resilient first arm attached to the first sensing tube of the sensor; and
at least one resilient second arm attached to the second sensing tube of the sensor,
wherein:
the two sensing tubes are excited during operation of the sensor to mechanical oscillations in a useful mode in a manner such that they oscillate, at least at times, essentially in opposite phase to one another;
the two arms of the mount are connected to one another, at a connecting location remote from the two sensing tubes; and the mount exhibits a first eigenmode having a mechanical resonance frequency, which is lower, preferably by 10% or more, than a lowest mechanical resonance frequency of the sensing tubes oscillating in the useful mode.

10. The mount as claimed in claim 9, wherein:
the mount exhibits a second eigenmode of predeterminable mechanical resonance frequency; and
said resonance frequency, $f_1$, of said first eigenmode differs from the resonance frequency, $f_2$, of said second eigenmode.

11. The mount as claimed in claim 9, wherein:
the resonant frequency of said first eigenmode is set to be more than 50% higher than the resonance frequency of said sensing tubes oscillating in the useful mode.

12. The mount as claimed in claim 9, wherein:
said resonance frequency, $f_1$, of said first eigenmode is set lower than said resonance frequency, $f_2$, of said second eigenmode.

13. The mount as claimed in claim 9, wherein:
said resonance frequency, $f_1$, of said first eigenmode is closer to be greater than 50 Hz.

14. The mount as claimed in claim 9, wherein:
said at least one resilient first arm and said at least one resilient second arm comprise material having a linear coefficient of thermal expansion smaller than $17 \times 10^{-6}/K$.

15. The mount as claimed in claim 9, further comprising:
a resilient third arm attached to said first sensing tube and at least one resilient fourth arm attached to said second sensing tube.

16. The mount as claimed in claim 9, wherein:
the mount serves for mounting at least two coils to sensing tubes of a vibration-type sensor, which vibrates at least at times.

* * * * *

UNITED STATES PATENT AND TRADEMARK OFFICE
CERTIFICATE OF CORRECTION

| | | |
|---|---|---|
| PATENT NO. | : 7,051,598 B2 | Page 1 of 1 |
| APPLICATION NO. | : 10/805391 | |
| DATED | : May 30, 2006 | |
| INVENTOR(S) | : Ennio Bitto et al. | |

It is certified that error appears in the above-identified patent and that said Letters Patent is hereby corrected as shown below:

Column 14, line 34, the word "provides" should be corrected to: -- provided --

Column 14, line 64, the word "fist" should be corrected to: -- first --

Column 16, line 23, the word "closer" should be corrected to: -- chosen --

Signed and Sealed this

Eighth Day of May, 2007

JON W. DUDAS
*Director of the United States Patent and Trademark Office*